June 19, 1951  G. L. USSELMAN  2,557,848
ARC-BACK COUNTER
Filed May 28, 1948
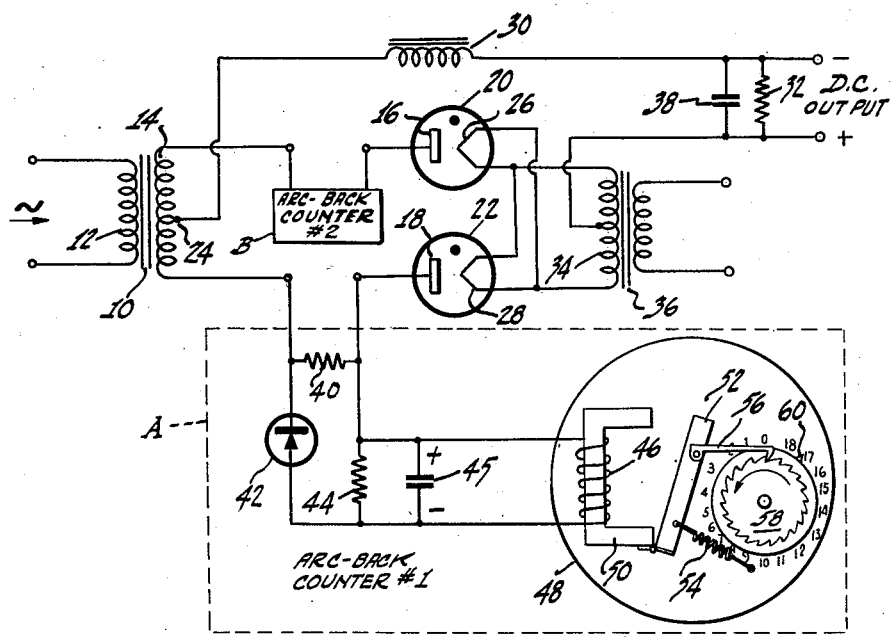
Inventor
GEORGE L. USSELMAN
By Morris A. Kaban
Attorney

UNITED STATES PATENT OFFICE 2,557,848

ARC-BACK COUNTER

George L. Usselman, Port Jefferson, N. Y., assignor to Radio Corporation of America, a corporation of Delaware Application May 28, 1948, Serial No. 29,822

2 Claims. (Cl. 235—92)

This invention relates to improvements in counting systems, and more particularly to a system for counting the number of arc-backs in rectifier tubes.

Electronic rectifier tubes, such as mercury vapor rectifiers and the like, are sometimes subject to arc-back faults, wherein the normal direction of current flow through the tube is temporarily reversed. While one such arc-back may not be particularly troublesome, a frequent recurrence of inverse current flow has an adverse effect on the output characteristics of the rectification system, and in general requires that the tube which is responsible be replaced. Prior to the present invention, arc-back indicators have been known which would merely register or indicate the fact that an arc-back had occurred without presenting a cumulative record of the number of such arc-backs.

Accordingly, it is a general object of the invention to provide an improved arc-back indicating system for electronic rectifiers.

A more specific object is to provide an improved arc-back indicating system in which the number of arc-backs occurring during a given period of time will be registered or recorded.

According to the invention, the foregoing and other objects and advantages are obtained by means of an auxiliary rectifying circuit arranged in parallel with a resistor which is connected in the anode to cathode circuit of a rectifier tube, the arrangement being such that current will flow through the auxiliary circuit only in response to arc-back current flow through the main rectifier. Counting means are included in the auxiliary rectifier circuit and are arranged to count the pulses of current that flow in the auxiliary circuit.

A more complete understanding of the invention may be had by reference to the following description of an illustrative embodiment thereof, when read in connection with the accompanying drawing, the single figure of which is a circuit diagram of a typical rectifying system in conjunction with an arc-back counter arranged in accordance with the invention.

Referring to the drawing, the portion of the circuit outside of the broken-line block A represents a typical 2-tube rectifying system, including an input transformer 10 having a primary winding 12 connected to a suitable source of alternating voltage (not shown), and a center tapped secondary winding 14. The two ends of the secondary winding 14 are connected to the anodes 16, 18 of a pair of rectifier tubes 20, 22 through arc-back counting circuits which will be more fully described hereinafter. The center tap 24 of the transformer secondary 14 is connected to the heater-cathodes 26, 28 of the rectifier tubes through a filter choke 30, a bleeder resistor 32, and the center tapped secondary 34 of a filament transformer 36, which is arranged to supply heater current to the rectifier tubes 20, 22. A filter capacitor 38 is also provided in parallel with the resistor 32 in the usual manner.

As was previously mentioned, the anode-to-cathode circuits of the rectifier tubes include arc-back counter circuits which are similar in character, and for the sake of simplicity, only one such circuit has been shown in the drawing within the broken line block A. It will be understood that the solid line block B, which is shown as connected in the anode circuit of the tube 20, includes a counting circuit similar to that shown in the broken line block. It will also be apparent that the circuit shown and described could as well be a single-tube half-wave rectifier rather than the full-wave rectifier which is shown, in which case only a single arc-back counter would be used, or it could be a rectifier circuit using as many as six or more tubes, each tube being supplied with an arc-back counter.

The arc-back counter circuit is seen to include a resistor 40 connected between the rectifier tube 22 and the secondary winding 14 of the transformer 10. The circuit also includes an auxiliary rectifying element 42, one terminal of which is connected to one end of the resistor 40, and the other terminal of which is connected to the other end of the resistor 40 through a second resistor 44 and the coil 46 of a relay-type counting device 48. A capacitor 45 is also connected in parallel with the resistor 44.

The rectifying element 42 may be a disc-type rectifier of selenium, magnesium-copper sulphide, or the like, or any of the well known electronic rectifiers may be used. As shown in the drawing, the auxiliary rectifier 42 is so arranged that a substantially infinite resistance is offered to current tending to flow from the secondary winding 14 of the transformer 10 through the auxiliary rectifier 42 to the anode 18 of the tube 22, while extremely low resistance is offered to current tending to flow in the opposite direction through the same path.

The relay-type counter 48 is one possible type of counting means which may be used with the circuit of the present invention, and is seen to include a coil 46 arranged to magnetize a core 50. An armature 52 is hinged at one end to the core 50 in such manner that passage of current through the coil 46 will attract the armature toward the core. The armature is provided with a holding spring 54 which normally holds the armature away from the core in the position shown, and with a pivoted pawl 56 which is in operative engagement with a ratchet wheel 58 rotatably mounted adjacent the armature. The ratchet wheel 58 may be provided with an indicator 60 which cooperates with a numbered scale adjacent the periphery of the ratchet wheel, so that the number of pulses of current passing through the field coil 46 will be indicated in an obvious manner. The counter mechanism shown and described has been chosen for the purposes of simple disclosure, although it will be apparent that other similar devices could as well be used, such as those having several number wheels which are able to count hundred of operations.

The operation of the circuit is as follows:

During normal operation of the rectifier tube 22, pulses of current will flow from the secondary winding 14 of the transformer 10, through the resistor 40 of the counting circuit, to the anode 18 of the tube 22. None of this normal current will flow through the rectifying element 42 because of the high resistance of the element 42 for current in this direction. However, if an arc-back occurs in the tube 22, a large pulse of current will flow from the anode 18 of the tube 22 through the resistor 40 to the secondary winding 14 of the transformer 10. A part of this current will flow through the parallel combination of the resistor 44 and the field coil 46, and through the rectifying element 42. A part of the current flowing through the auxiliary rectifier 42 will also be effective to charge the capacitor 45 in the polarity indicated in the drawing, and the capacitor 45 therefore may serve to protect the field coil 46 from large surges of current, and at the same time function to store part of the energy represented by the arc-back current. As the arc-back current drops off, the capacitor 45 discharges through the field coil 46 and the resistor 44, although the resistor 44 is made sufficiently large so that the majority of the discharge current from the capacitor 45 will flow through the field coil 46. Thus, if the arc-back current does not continue to flow for a long enough period to fully actuate the counting mechanism 48, the supplementary discharge current from the capacitor 45 assures that the action of the counter 48 will be completed. After each arc-back, the holding spring 54 resets the counting mechanism in readiness for the next arc-back.

It may be found advisable to have the resistor 44 of Thyrite or some similar material having the characteristic of increasing resistance with decreasing voltage drop.

Although the arc-back current through a rectifier tube may be extremely large, it is ordinarily of very short duration, and not usually repeated immediately. Hence the auxiliary rectifying element 42 can be quite small and still give satisfactory performance.

The counting system shown within the broken lines block A could conveniently be made up in a small unit and mounted on the anode buss of each rectifier tube. The counters should be mounted where they can be seen from the front of the rectifier panel, and in such a position that the indicator could be reset to 0 after any desired period of time, with adequate provision being made to protect operating personnel from the high voltage of the rectifier.

Since many changes and modifications could be made in the circuit shown and described, within the scope and spirit of the invention, the foregoing is to be construed as illustrative and not in a limiting sense.

What is claimed is:

1. In an arc-back counter for a rectifying system which includes a source of alternating current and a rectifying device in parallel therewith, in combination, a first resistor connected between said device and said source, a second resistor and an auxiliary rectifier connected in series between the terminals of said first resistor, a capacitor connected in parallel with said second resistor, and current pulse counting means connected in parallel with said second resistor.

2. In an arc-back counter for a rectifying system which includes a source of alternating current and a rectifying device in parallel therewith, in combination, a first resistor between said device and said source, a second resistor and an auxiliary rectifier connected in series between the terminals of said first resistor, a capacitor connected in parallel with said second resistor, and a relay-operated counting device having its relay connected in parallel with said second resistor.

GEORGE L. USSELMAN.

REFERENCES CITED

The following references are of record in the file of this patent:

UNITED STATES PATENTS

| Number | Name | Date |
|---|---|---|
| 1,762,712 | Charlton | June 10, 1930 |
| 2,329,048 | Hullegard | Sept. 7, 1943 |
| 2,405,121 | Fehr | Aug. 6, 1946 |